United States Patent
Rifkin et al.

(10) Patent No.: US 7,412,425 B2
(45) Date of Patent: Aug. 12, 2008

(54) PARTIALLY SUPERVISED MACHINE LEARNING OF DATA CLASSIFICATION BASED ON LOCAL-NEIGHBORHOOD LAPLACIAN EIGENMAPS

(75) Inventors: Ryan Rifkin, Cambridge, MA (US); Stuart Andrews, Providence, RI (US)

(73) Assignee: Honda Motor Co., Ltd., Tokyo (JP)

( * ) Notice: Subject to any disclaimer, the term of this patent is extended or adjusted under 35 U.S.C. 154(b) by 160 days.

(21) Appl. No.: 11/108,031

(22) Filed: Apr. 14, 2005

(65) Prior Publication Data

US 2006/0235812 A1 Oct. 19, 2006

(51) Int. Cl.
*G06F 15/18* (2006.01)
*G06K 9/62* (2006.01)
*G06K 9/46* (2006.01)

(52) U.S. Cl. .......................... 706/12; 382/225; 382/159
(58) Field of Classification Search .................. 706/12; 382/225, 159

See application file for complete search history.

(56) References Cited

OTHER PUBLICATIONS

Belkin, "Laplacian Eigenmaps for Dimensionality Reduction and Data Representation", 2001.*
He et. al., "Face Recognition Using Laplacianfaces", 2005.*
Lee et. al. (Lee), "Video-Based Face Recognition Using Probabilistic Appearance Manifolds", 2003.*
Belkin, "Problems of Learning on Manifolds", 2003.*
Aggarwal, C.C. et al., "On the Surprising Behavior of Distance Metrics in High Dimensional Space," Lecture Notes in Computer Science, 1973, 15 pages.
Beer, I. et al., "RuleBase: an Industry-Oriented Formal Verification Tool," 33rd Design Automation Conference, ACM, Inc., 1996, 6 pages.
Belkin, M. et al., "Laplacian Eigenmaps for Dimensionality Reduction and Data Representation," Dec. 8, 2002, pp. 1-28.
Belkin, M. et al., "Semi-Supervised Learning on Manifolds," Submitted to Journal of Machine Learning Research, Nov. 29, 2002, pp. 1-23.
Belkin, M. et al., "Semi-Supervised Learning on Reimannian Manifolds," Machine Learning, 2004, pp. 209-239, vol. 56.
Bengio, Y. et al., "Learning Eigenfunctions of Similarity: Linking Spectral Clustering and Kernel PCA," Technical Report 1232, Feb. 28, 2003, pp. 1-27.

(Continued)

*Primary Examiner*—David Vincent
*Assistant Examiner*—Nathan H Brown, Jr.
(74) *Attorney, Agent, or Firm*—Fenwick & West LLP; Mark Duell

(57) ABSTRACT

A local-neighborhood Laplacian Eigenmap (LNLE) algorithm is provided for methods and systems for semi-supervised learning on manifolds of data points in a high-dimensional space. In one embodiment, an LNLE based method includes building an adjacency graph over a dataset of labelled and unlabelled points. The adjacency graph is then used for finding a set of local neighbors with respect to an unlabelled data point to be classified. An eigen decomposition of the local subgraph provides a smooth function over the subgraph. The smooth function can be evaluated and based on the function evaluation the unclassified data point can be labelled. In one embodiment, a transductive inference (TI) algorithmic approach is provided. In another embodiment, a semi-supervised inductive inference (SSII) algorithmic approach is provided for classification of subsequent data points. A confidence determination can be provided based on a number of labeled data points within the local neighborhood. Experimental results comparing LNLE and simple LE approaches are presented.

24 Claims, 5 Drawing Sheets

OTHER PUBLICATIONS

Bengio, Y. et al., "Out-of-Sample Extensions for LLE, Isomap, MDS, Eigenmaps, and Spectral Clustering," Advances in Neural Information Processing Systems, Jul. 25, 2003, pp. 1-10.

Bengio, Y. et al., "Spectral Clustering and Kernel PCA are Learning Eigenfunctions," Technical Report 1239, Jul. 25, 2003, pp. 1-9.

Castelli, V. et al., "The Relative Value of Labeled and Unlabeled Samples in Pattern Recognition with an Unknown Mixing Parameter," IEEE Transactions on Information Theory, Nov. 1996, pp. 2102-2117, vol. 42, No. 6.

Chung, *Spectral Graph Theory*, CBMS Regional Conference Series in Mathematics, No. 92, Jun. 6-10, 1994.

Cox, T.F. et al., *Multidimensional Scaling*, 1994.

Dijkstra, E. W., "A Note on Two Problems in Connexion with Graphs," Numerische Mathematik, 1959, pp. 269-271, vol. 1.

Friedman, J. L. et al., "An Algorithm for Finding Best Matches in Logarithmic Expected Time," ACM Transactions on Mathematical Software, Sep. 1977, pp. 209-226, vol. 3, No. 3.

Golub, G.H. et al., *Matrix Computations*, 1983.

Kemp, C. et al., "Semi-Supervised Learning with Trees," Advances in neural Information Processing Systems, 2003, 8 pages.

Lecun, Y. et al., "The MNIST Database of Handwritten Digits," [online] [Retrieved on Mar. 10, 2006] Retrieved on the internet<URL:http://yann.lecun.com/exdb/mnist/index.html>.

Lehouq, R.B. et al., *Arpack User's Guide*, 1998, Society for Industrial and Applied Mathematics.

Lehouq, R.B. et al., "Deflation Techniques for an Implicitly Restarted Arnoldi Iteration," SIAM Journal on Matrix Analysis and Applications, 1996, pp. 789-821, vol. 17.

MATLAB code, [online] [Retrieved on Mar. 10, 2006] Retrieved from the Internet<URL:http://people.cs.uchicago.edu/~misha/ManifoldLearning/MATLAB/Laplacian.tar>.

Ng, A.Y. et al., "On Spectral Clustering: Analysis and an Algorithm," Advances in Neural Information Processing Systems, 2002, 8 pages, MIT Press.

Omohundro, S.M., "Bumptrees for Efficient Function, Constraint, and Classification Learning," Technical Report 91-009, 7 pages, International Computer Science Institute, Berkeley, no date.

Rifkin, R. et al., "Local-Neighborhood Laplacian Eigenmaps," 8 pages, no date.

Roweis, S.T. et al., "Nonlinear Dimensionality Reduction by Locally Linear Embedding," Science, Dec. 22, 2000, pp. 2323-2326, vol. 290.

Tenenbaum, J.B. et al., "A Global Geometric Framework for Non-linear Dimensionality Reduction," Science, Dec. 22, 2000, pp. 2319-2323, vol. 290.

* cited by examiner

PARTIALLY SUPERVISED MACHINE LEARNING OF DATA CLASSIFICATION BASED ON LOCAL-NEIGHBORHOOD LAPLACIAN EIGENMAPS

FIELD OF THE INVENTION

The present invention relates generally to machine learning and more particularly to machine based, semi-supervised, classification of unlabelled data.

BACKGROUND OF THE INVENTION

Semi-supervised machine learning involves the ability of a machine to learn a classification or regression function from a set of both labelled and unlabelled sample data points. This is an important problem because in many domains, such as for example image, audio, and text documents, unlabelled data is much easier and cheaper to collect than labelled data. However, a large amount of data is not very useful unless we can determine what the data is or what it relates to. Thus, the ability of a machine to classify unlabelled data provides a significant advantage for processing large amounts of data for a useful purpose. For example, machine-based classification of images is used in a myriad of applications, e.g., face recognition, motion detection, and the like.

The basic idea of semi-supervised machine learning is to learn or estimate (often implicitly) an underlying density function between labelled and unlabelled data points to classify the unlabelled data points. Generally, in most practical applications data points include many variables or dimensions, i.e., the data points belong to a high dimensional space. For example, a digital image may have as many dimensions as there are pixels in the image (e.g., 5 million dimensions). The estimation of density functions in such high dimensional spaces may require exponentially many more examples than the dimensionality ("d") of the space. Therefore, generally an assumption is made with respect to the relationship between data points in a dataset. A common assumption is that the data points in a dataset, due to the relationships between the data points, form a lower-dimensional structure or manifold in a high-dimensional space.

Generally there are two different approaches for machine-based classification of unlabelled data: the transductive inference ("TI") approach and the semi-supervised inductive inference ("SSII") approach. Based on the TI approach, the machine classifies unlabelled data points from a given set of labelled and unlabelled data points. All the data points are provided to the system before the learning commences. Conversely, the SSII approach relies on a training set consisting of both labelled and unlabelled examples, and a separate set containing unlabelled data points only for classification. According to the SSII approach, the training set is first used to construct or learn a function that can then be used to classify the unlabelled data points in the subsequent set.

An important distinction between the TI and SSII approaches is the amount of computational resources required for their implementation. With unlimited resources, an SSII problem can be solved by running a TI algorithm in real time, where data points are provided to the system and classified in real time. However, because of computational resource limitations, processing a training set first makes it so that classifying new examples is substantially less computationally expensive than running a real time TI algorithm. In general, SSII algorithms are not more accurate than TI algorithms, because every SSII algorithm can be trivially viewed as a TI algorithm. In other words, knowing the unlabelled data points before learning begins cannot make classification more difficult. Therefore, SSII algorithms can generally perform only as good as a "corresponding" TI algorithm. Where accuracy is more desirable, TI algorithms are preferred and if they can be made sufficiently fast, they can replace corresponding SSII algorithms. However, TI algorithms operate over a closed set of data points. Thus, where flexibility to introduce new out-of-sample unlabelled data points is desired, SSII algorithms are preferred because they avoid the computational expense of re-learning the density functions for each new data point.

There are a number of algorithms for semi-supervised learning on manifolds. Several of the manifold-learning algorithms are quite similar: work of Bengio et al. (2003) places multi-dimensional scaling (Cox & Cox, 1994), spectral clustering (Ng et al., 2002), Laplacian Eigenmaps (Belkin & Niyogi, 2004), isomap (Tenenbaum et al., 2000), and locally linear embedding (Roweis & Saul, 2000) in a single mathematical framework (all of which are incorporated herein by reference).

One effective approach for semi-supervised machine learning includes the Laplacian Eigenmaps ("LE") algorithm. The MATLAB code that implements the LE algorithm is available at http://people.cs.uchicago.edu/~misha/ManifoldLearning/MATLAB/Laplacian.tar and is incorporated herein by reference. The LE algorithm has been demonstrated on the MNIST hand-written digit dataset (available at http://yann.lecun.com/exdb/mnist/index.html). A sample dataset 100 from the MNIST database is shown in FIG. 1. A first set of labelled points 102 is provided and a second set of unlabelled points 104 is to be classified. The LE algorithm was used to perform a digit classification task (as well as on several other tasks) using very few labelled examples (as further detailed below) and showed a reasonably good accuracy.

However, there are several drawbacks to the LE algorithm. The LE algorithm is very computationally expensive. For example, one resource intensive computation LE requires is the computation of the adjacency graph. Using a direct approach, the distance between all pairs of data points is computed, and for each point, the closest neighbors are kept. For a large dataset, the $O(n^2d)$ time to compute all the distances dwarfs the time required to keep track of the closest neighbors. This step can be implemented to use only linear memory, but $O(n^2d)$ time can be prohibitive for very large problems.

An even more computationally demanding step is the solution of the eigenvalue problem. The LE algorithm requires the computation of an eigendecomposition of an adjacency graph built over the dataset. Although this graph is extremely sparse, interior eigenvectors are required, making the eigendecomposition extremely expensive. For a large, sparse matrix, eigenproblems can be solved, for example based on MATLAB code using the implicitly restarted Arnoldi method, an iterative method provided by ARPACK (Lehoucq & Sorensen, 1996; Lehoucq et al., 1998), which are incorporated herein by reference. The largest eigenvalues of a sparse matrix (and their corresponding eigenvectors) can be found rapidly using only sparse matrix-vector multiplications (Golub & Loan, 1996, incorporated herein by reference). However, the eigenvectors corresponding to the smallest eigenvalues of the Laplacian graph matrix ("L") are required; ARPACK needs to factorize L in the inner loop of the algorithm in order to do this. This factorization will be substantially less sparse than L itself. The factorization can require $O(n^3)$ time and $O(n^2)$ memory. In practice, a machine with two gigabytes ("GB") of random access memory ("RAM")

was unable to process the 60,000-point MNIST dataset with the LE algorithm due to lack of memory. This indicates that performing a global eigendecomposition on a very large dataset may well be infeasible in many conventional systems.

Another drawback is that the LE algorithm is a transductive inference TI algorithm without an obvious, computationally-effective way to convert it to an SSII algorithm. There is no obvious way to apply the LE approach to new out-of-sample data points without solving the resource-intensive global eigenvalue problem. Thus LE algorithm is ineffective for labeling new data points that were not part of the initial dataset.

Accordingly, what is needed is a machine learning system and method for semi-supervised learning on manifolds that (1) is less computationally expensive than existing methods, and (2) can provide new point classification without requiring re-computation over the entire dataset.

SUMMARY OF THE INVENTION

The present invention includes methods, computer readable media, and systems for semi-supervised machine learning based on local-neighborhood Laplacian eigenmaps ("LNLE") approaches. LNLE provides a fast TI algorithm that can be easily extended into an SSII algorithm. LNLE enables machine classification of an unlabelled data point by considering the entire dataset to consist of only those data points in a local neighborhood of the data point to be classified. The notion of a local manifold structure is used to provide more relevant information for classification of unlabelled data points than the global manifold of the entire dataset.

According to one aspect of the invention, LNLE avoids computing an eigendecomposition over the entire dataset because the classification is focused on a localized version of the dataset, thus allowing a system to process much larger datasets. Additionally, new points are easily classified by adding them to an adjacency graph structure and processing them with respect to their local neighborhood.

According to another aspect of the invention, LNLE allows a system to divide classifications of unlabelled data points into "high confidence" and "low confidence" classifications.

In accordance with one illustrative embodiment of the present invention, a computer-based method, computer readable media, and a system are provided for learning labels for unlabelled data points. In one embodiment, a method includes determining relative distances between all the data points in a dataset. The method also includes determining a set of neighboring data points with respect to the unlabelled data point. An eigen decomposition of a matrix of distances between the set of neighboring data points is performed to determine a function. Finally, the unlabelled data point is labelled based on the result obtained from evaluating the function with respect to the unlabelled data point.

In an alternative embodiment, a method also includes labeling an additional unlabelled data point that was not part of the initial dataset. The additional unlabelled data point is received and its relative distance with respect to the data points in the original dataset is determined. A second set of neighboring data points with respect to the additional data point is then determined. The method also includes determining an eigen decomposition of a matrix of distances between this second set of neighboring data points to determine another function. Then, based on an evaluation of the function the additional unlabelled data point is labelled.

In an alternative embodiment a confidence value is provided based on a number of labelled data points that are determined to be within the set of neighboring data points.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

DETAILED DESCRIPTION OF PREFERRED EMBODIMENTS

Throughout the following description labelled data points are referred to as $n_L$ and unlabelled data points are referred to as $n_U$. A dataset n is thus defined as $n_L + n_U$. The letter y is used to denote the labels of the labelled data points $n_L$. The term eigenpair is used to refer to an eigenvalue $\lambda$ and its corresponding eigenvector v, and the magnitude of an eigenpair is defined as $|(\lambda, v)| = |\lambda|$.

Figure 1:
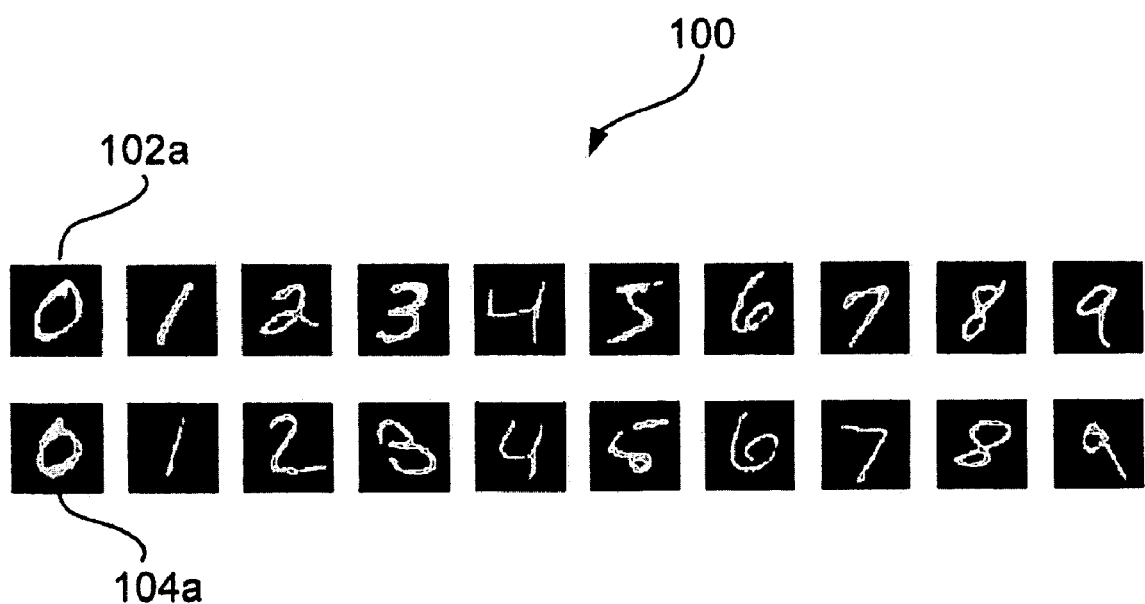
FIG. 1 is a sample dataset from the MNIST database of hand-written digits.
Figure 2:
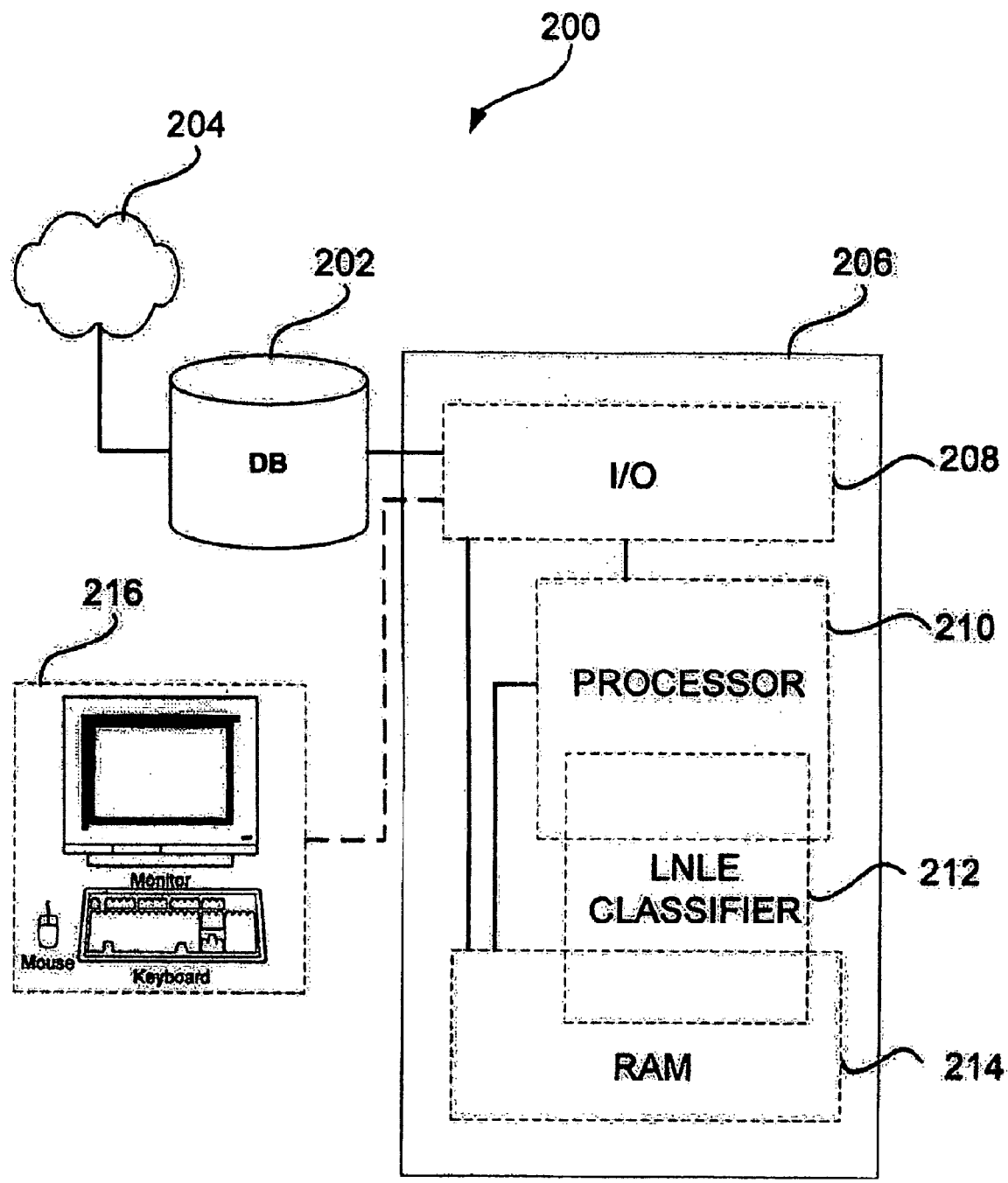
FIG. 2 shows a system block diagram illustrating a sample embodiment of a machine learning system.

Referring now to FIG. 2, a system block diagram illustrating a sample embodiment of a machine learning system is shown. The machine learning system 200 receives data units (e.g., data points $n_L$ and $n_U$) from a data storage unit 202. The data units may belong to an existing dataset n, e.g., the MNIST dataset, or may be received from a data source 204 and stored in the data storage unit 202. For example, a data source 204 may include a digital imaging device (e.g., a camera, image sensor, or the like), a digital audio recording device, or other digital data capturing devices. Alternatively, a data source 204 may be a remote data transmission system transmitting data through a wired or wireless network, e.g., an audio or video broadcasting system. In one embodiment, the data source 204 and data storage unit 202 are external to a machine 206 for performing machine learning functions on the data. In an alternative embodiment the data source 204 is included within the machine 206. For example, machine 206 may include a device for capturing the data units, e.g., a camera equipped automotive vehicle. In yet another embodiment the data source 204 is combined with the data storage unit 202, and is either internal or external to the machine 206, e.g., a video compact disk ("CD") may be a data source 204 and data storage unit 202 included in a computer with a CD player.

In one embodiment, machine 206 is a conventional general-purpose computer, such as for example, an Intel® processor based personal computer. However, machine 206 includes any machine with computing resources capable of implementing the algorithms described herein, for example, machine 206 may be embodied as an intelligent vehicle, a humanoid robot, or other computing capable systems.

In one embodiment, machine 206 includes an input/output ("I/O") module 208 for interfacing with external devices, such as an external data storage unit 202. The I/O module 208 loads data to a memory 214 internal to the machine 206. For example, in one embodiment, a general-purpose computer with two GB of RAM is used as further described below. Other embodiments may include different memory 214 configurations, such as on-chip cache memory, flash memory, or the like.

The machine 206 also includes a processor 210. In one embodiment, processor 210 is a conventional computer microprocessor, such as a Pentium® processor available from Intel Corporation of Santa Clara, Calif., an Athlon™ processor available from Advanced Micro Devices, Inc. of Sunnyvale, Calif., a G5 processor from Apple Computer, Inc. of Cupertino, Calif., or the like. In alternative embodiments, processor 210 may be one or more of other logic processing devices, such as embedded processors, custom processors, microcontrollers, programmable ASICs, or the like.

Machine 206 also includes a local-neighborhood Laplacian eigenmaps ("LNLE") classifier module 212. In one embodiment, the LNLE classifier module 212 is implemented in software with instructions that when executed by processor 210 implement one or more methods as described below. The LNLE classifier module 212 can be stored in data storage unit 202 and loaded to RAM 214 for execution by processor 210. In an alternative embodiment the LNLE classifier module 212 is implemented in hardware as an ASIC for semi-supervised machine learning. In yet another embodiment, the LNLE classifier module 212 is implemented as firmware in an internal flash memory device configured to operate with a custom controller processor 210. Other embodiments with various combinations of software and hardware for the LNLE classifier module 210 are possible and considered to be included within the scope of the claimed invention.

In one embodiment, the machine learning system 200 also includes one or more user interface devices 216. For example, user interface devices 216 may include a graphics display (e.g., a monitor, flat panel display, or the like), a keyboard, a pointing device, and other similar user input/output devices. The user interface devices 216 are coupled to the machine 206 through one or more I/O modules 208. In one embodiment, although user interface devices 216 are not present during normal operation, machine 206 includes an I/O module 208 configured to provide a connection (either wired or wireless) to one or more user interface devices 216, for example, for labeling a training set of data points $n_L$, programming, trouble-shooting, monitoring, or the like. Such an embodiment of the machine 206 may include an intelligent vehicle, a robot, or the like.

Figure 3:
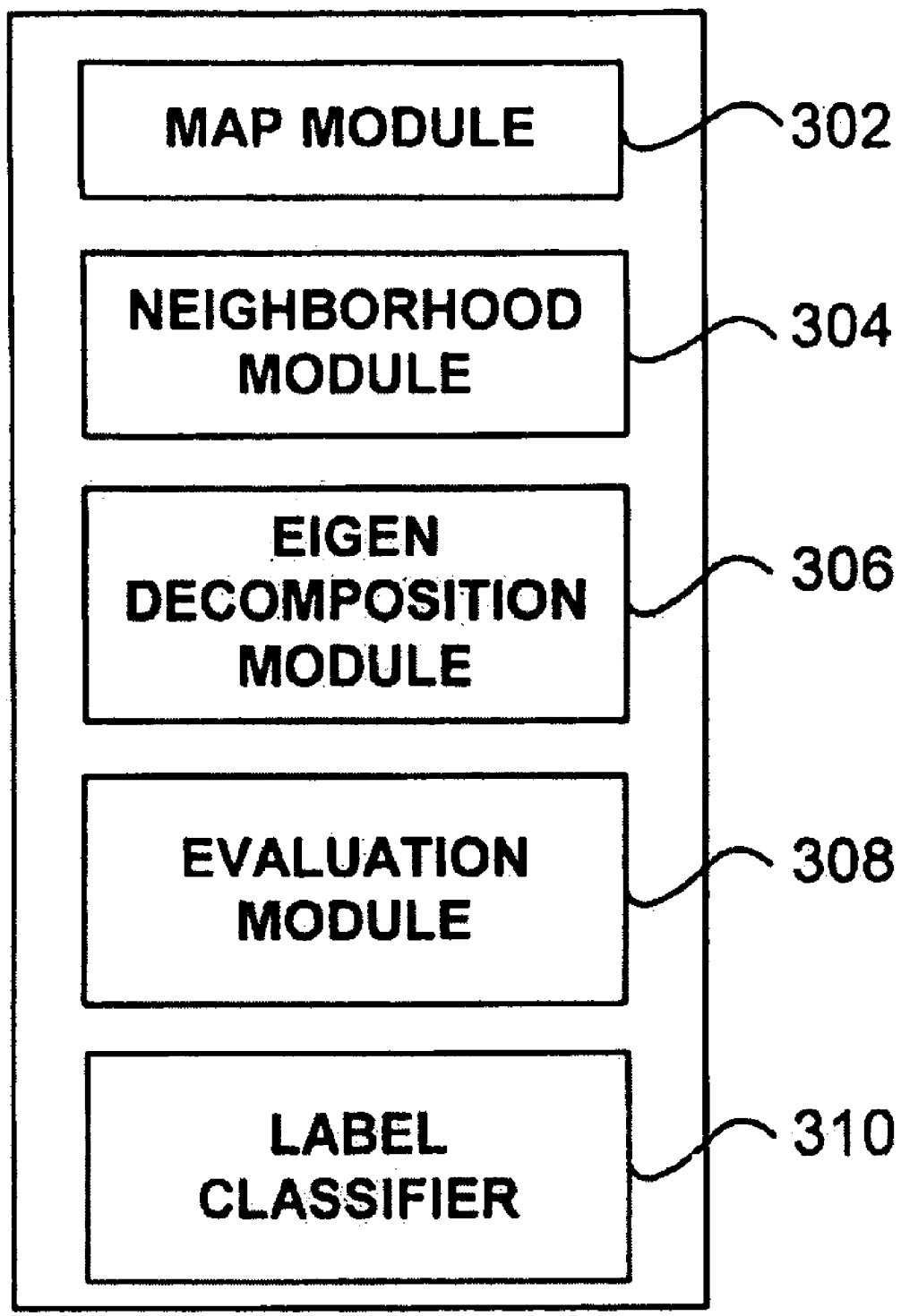
FIG. 3 shows a functional block diagram illustrating one embodiment of a semi-supervised machine learning LNLE classifier module.

Now referring to FIG. 3, a functional block diagram illustrating one embodiment of a semi-supervised machine learning LNLE classifier module is shown. In one embodiment, the LNLE classifier module 212 includes a map module 302. The map module 302 has access to the dataset n for constructing an adjacency graph or matrix, also called the adjacency map. Generally, the adjacency map is stored in memory 214 accessible to other modules. The LNLE classifier module 212 also includes a neighborhood module 304. The neighborhood module 304 accesses the adjacency map, e.g., from memory 214, to determine a set or cluster of neighboring data points with respect to a given data point $n_U$. In addition, the LNLE classifier module 212 includes an eigen decomposition ("ED") module 306 that is coupled to the neighborhood module 304 for estimating density functions with respect to the set or cluster of neighboring data points. An evaluation module 308 evaluates the density functions estimated by the ED module 306 for the unlabelled data point $n_U$ and provides a result with an associated confidence value. The label classifier 310 is coupled to the evaluation module 308 to receive the evaluation result and classify the $n_U$ data point according to the evaluation result.

Figure 4:
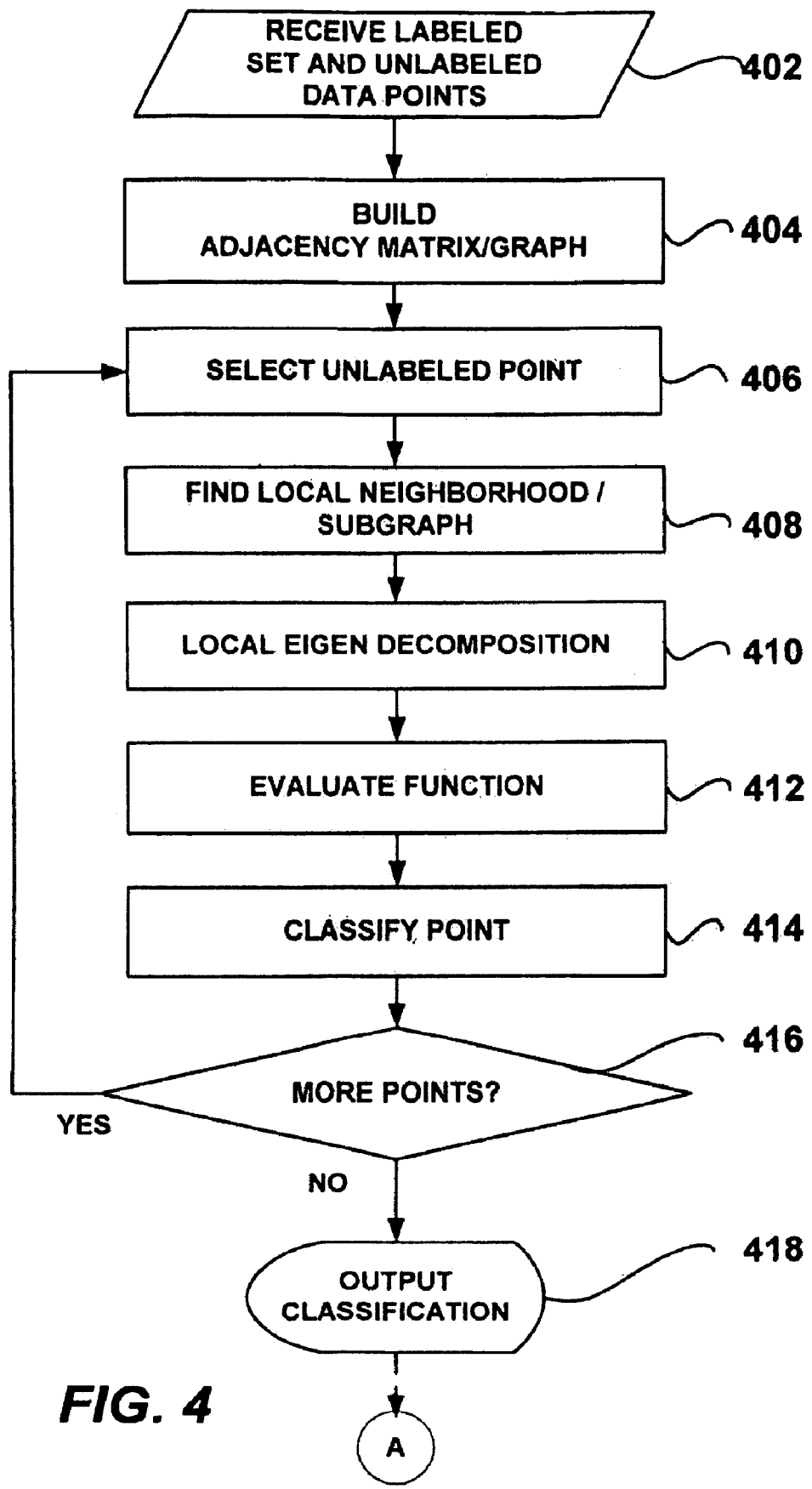
FIG. 4 shows a flow chart illustrating one embodiment of an LNLE method for implementing a TI algorithm.

Now referring to FIG. 4, a flow chart illustrating one embodiment of an LNLE method for implementing a TI algorithm is shown. In this embodiment, an initial dataset n is input 402. The dataset n includes a small number of labelled sample data points $n_L$ and unlabelled sample data points $n_U$ for classification. Based on the dataset n, a global adjacency graph or matrix is generated 404, for example, as a sparse symmetric adjacency matrix W. To generate 404 the adjacency matrix W, with respect to each data point, a matrix element $w_{ij}=1$ if data point i is one of the nearest neighbors k of data point j or if j is one of the nearest neighbors of data point i, and $w_{ij}=0$ otherwise. For the construction of the global adjacency matrix W, k is a programmable parameter to define the number of nearest neighbors for each point, e.g., eight. It should be noted that, in addition to simple 1s and 0s, other values, e.g., relative distances between data points or the like, can be used to compose the adjacency matrix (e.g., weighted adjacency matrices). For example, in one embodiment, point distances weighted by the "heat kernel" distance ("d"), i.e., $d(x1, x2)=\exp(\|x1-x2\|^2/c)$, are used. In this embodiment, c corresponds to a programmable parameter for normalizing the distance values, for example, in one embodiment c is set to the square root of the expected distance between pairs of data points. In another embodiment, instead of using the "heat kernel" distance, actual distances between data points in the high-dimensional space are used, e.g., distance measured in number of pixels.

Next, in one embodiment, an unlabelled point x is selected 406 for classification. The selection 406 may be provided by a user, randomly chosen, or based on other factors. With respect to the selected point x ($n_U=x$), a local neighborhood or cluster is determined 408. In one embodiment, a breadth-first search is used to construct a subgraph or local adjacency matrix $W_x$ of the full adjacency graph W consisting of the determined local neighborhood around x. To generate 408 the local adjacency matrix $W_x$, a number $k_x$ of nearest neighbors of data point x are found. For example, in one embodiment 2000 nearest neighbors are used. The $k_x$ closest data points to x in the adjacency graph W are selected, where $k_x$ is another programmable parameter and it can be tuned according to computational resources and required accuracy e.g., in the experiments conducted $k_x$ values of between 2000 to 4000 were used. With the $k_x$ local neighbors, the graph local Laplacian $L_x$ ($L_x=W_x-B_x$) is constructed. $B_x$ is a diagonal matrix whose elements are the row sums of $W_x$ (i.e., $b_{ii}=\Sigma_j w_{ij}$).

In this embodiment, a local eigen decomposition is performed 410 next. The local Laplacian $L_x$ is symmetric and positive semi-definite. From spectral graph theory, it is known that any function defined at the vertices of the adjacency graph can be decomposed into a sum of eigenfunctions of its Laplacian. In addition, eigenfunctions corresponding to the smallest eigenvalues of the Laplacian are known to be smooth. Therefore, to perform the local eigen decomposition 410 of the local Laplacian $L_x$, the p smallest eigenpairs ($\lambda$, v)

of $L_x$ are derived (where p is another programmable parameter of the algorithm). In one embodiment, the eigenvalues (λ) themselves are ignored. The n by p eigenvector matrix E is partitioned into the $n_L$ by p matrix $E_L$ and the $n_U$ by p matrix $E_U$ corresponding to the labelled and unlabelled points. If p is much smaller than the dimensionality of the data points d, this transformation to the eigenfunction space can be viewed as a dimensionality reduction. However, generally, a better choice of p is larger than d. After the eigen decomposition is completed, a smooth function $a_x$ in the local graph $W_x$ is determined. In one embodiment, a linear least-squares fit is performed to find a smooth function $a_x$ in the local subgraph $W_x$.

Next, the function $a_x$ is evaluated 412 with respect to the selected data point x. In one embodiment, a simple linear least-squares regression is solved with respect to the local subgraph $W_x$. Assuming that the problem is binary (i.e., only two labels are provided in the labelled set for classification), the p-dimensional hyperplane $a_x$ is constructed by solving:

$$E_L^T E_L a_x = E_L^T y$$

Given $a_x$, the output at the unlabelled points is given by:

$$y_U = E_U a_x.$$

In one embodiment, if the classification task is multiclass (i.e., the sample labelled set includes more than two classes), a one-vs-all hyperplane $a^c$ is constructed for each class c by solving the equation above with a right-hand-side $y^c$, where $y_i^c = 1$ if the ith labelled data point $n_{Li}$ belongs to class c and $y_i^c = 0$ otherwise.

Once the function y is evaluated, the selected data point x is classified 414 by applying a label or classification to the previously unlabelled data point. In one embodiment, one of two labels is selected based on the result of the function. For example, a first label corresponds to a positive result ($y_U > 0$) and a second label corresponds to a negative result ($y_U < 0$). In a multiclass embodiment, the final classification can be made by applying each of the $a^c$ to an unlabelled point $n_U$ and selecting the class c with the highest score. It should be noted that the eigenvector matrix $E_L$ does not depend on the class c. Accordingly, the second equation above is solved for each class c, but the eigendecomposition is performed only once.

Additional unlabelled data points $n_U$ in the dataset n are similarly processed 416 by repeating steps 406-414. At any time, the classification of one or more data points is output 418. In one embodiment, the output involves accessing a dataset data structure and writing the class label in a predefined field associated with each data point. In another embodiment, the output 418 involves displaying the data point, e.g., an image, as a result of a recognition task, e.g., an image based face recognition application. Many other output methods are possible and considered within the scope of the present invention.

The LNLE algorithm has several advantages. For example, one advantage includes the absence of a global eigendecomposition of the entire adjacency graph W. In conventional approaches, the global eigendecomposition is the most time-consuming and computationally intensive step. In addition, due to the significant memory requirements for processing, a global eigendecomposition for very large datasets may not be possible in conventional computer systems. The LNLE algorithm alleviates this problem by performing a local eigendecomposition, which allows the algorithm to be extended to much larger datasets. Another advantage is that given the local nature of LNLE, it is easy to construct an SSII variant of the algorithm as illustrated in FIG. 5.

Figure 5:
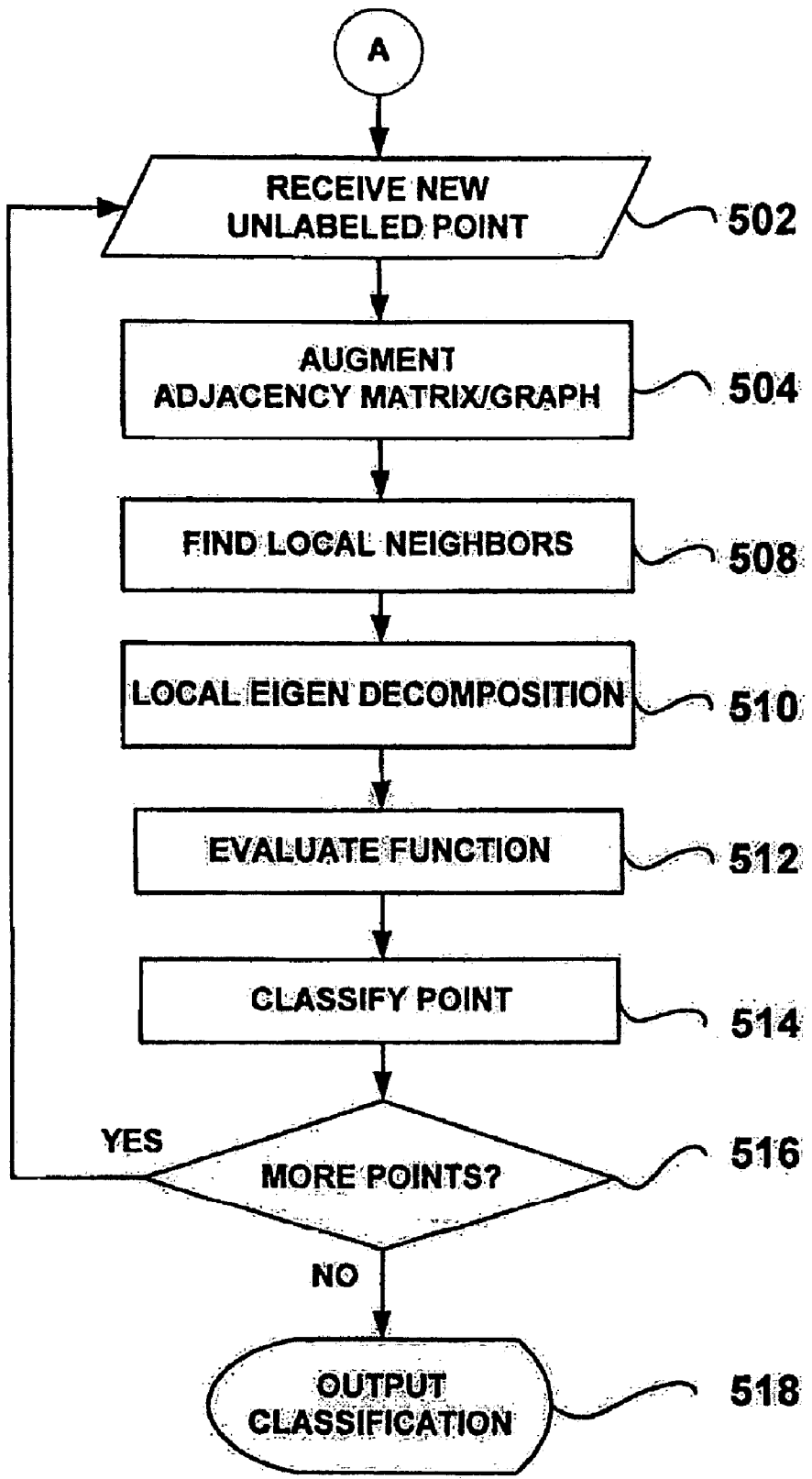
FIG. 5 shows a flow chart illustrating one embodiment of an LNLE method for implementing an SSII algorithm.

Referring now to FIG. 5, a flow chart illustrating one embodiment of an LNLE method for implementing an SSII algorithm is shown. In this embodiment, the steps described with respect to FIG. 4 are assumed to be performed with respect to the initial dataset n (illustrated by connector A). A new out-of-sample unlabelled data point x' is received 502. The out-of-sample data point x' is not part of the original dataset n, which was input at step 402. For example, out-of-sample data point x' may be a new image captured by a data source 204. The new data point x' is added 504 to the adjacency graph W building an augmented adjacency graph W' by determining the k local neighbors, e.g., eight, around x' and adding the corresponding values to the adjacency matrix, e.g., distances, 0/1, or the like. Then, the larger group of $k_x$ local neighbors (e.g., 4000) around new data point x' are found 508 to build a local neighborhood subgraph $W_{x'}$ in the augmented adjacency graph W'. Then, steps 510-518 are essentially a repetition of steps 410-418 with respect to the new data point x'. Thus, the treatment of out-of-sample and in-sample points is similar. Accordingly, the algorithms perform nearly identically on out-of-sample and in-sample points.

Another aspect according to one embodiment of the present invention involves a confidence determination with respect to the classification result. According to one embodiment, an LNLE algorithm constructs a local neighborhood subgraph $W_x$, performs a local eigendecomposition, and solves a least-squares problem for each unlabelled data point $n_U$ to be classified. Under some circumstances the initial dataset n may include a very small number of sample labelled data points $n_L$. Under these circumstances, there is a substantial chance that a local neighborhood around an unlabelled data point $n_U$ will contain no labelled data points $n_L$ within it.

To address this potential problem, in one embodiment, two approaches for LNLE classification methods are provided. A first approach, LNLE(G), operates based on a random estimate of a label. Using an LNLE(G) approach, when the local neighborhood $W_x$ for a given data point x ($n_U = x$) contains no labelled data points $n_L$, a random guess for the class label to give the data point x is made. The resulting classification c of the data point includes a "low confidence" indication. Conversely, in one embodiment, where labelled data points $n_L$ exist in the local neighborhood $W_x$, a "high confidence" indication is provided. In yet another embodiment, the confidence determination is based on a scale (e.g., including more than two values) according to the number of labelled data points $n_L$ within the local neighborhood $W_x$ of the data point x being classified.

Another approach to address the low labelled-samples problem is the LNLE(R) rejection approach. Using an LNLE (R) approach, when an unlabelled point x is selected for classification and there are no labelled data points $n_L$ are within the local neighborhood $W_x$, a classification rejection is made and no classification results. Alternatively, in one embodiment, when a rejection condition is determined, the neighborhood size $k_x$ is enlarged by a factor $\Delta$ ($k_x = k_x + \Delta$) iteratively until the rejection condition does not occur, i.e., at least one labelled data point $n_L$ becomes part of the local neighborhood $W_x$, or until the size of the neighborhood $W_x$ becomes excessively large (e.g., a maximum $k_x$ is reached).

EXPERIMENTAL RESULTS ACCORDING TO EXPERIMENTAL EMBODIMENTS

In this section a report on a collection of experiments designed to compare the LE and LNLE algorithms is provided. Two primary questions are addressed. The first question is whether LNLE is as accurate as LE. The second is whether LNLE is computationally less demanding than LE.

With respect to one experimental embodiment, a dataset of the MINST database was preprocessed by using principal component analysis ("PCA") to represent each 28 by 28 image as a 100-dimensional vector. A conventional general-purpose computer with two GB of RAM was used to implement the LNLE algorithms according to various embodiments of the present invention.

In previous published experiments, an LE algorithm exhibited striking improvement over a baseline k-nearest neighbor algorithm that ignored the unlabelled data points $n_U$. In preliminary experiments, these results for k-NN were replicated and very similar results were obtained using well-tuned support vector machines ("SVMs") as a baseline classifier.

Although Belkin and Niyogi, authors of the LE algorithmic approach, stated that "the adjacency matrices are very sparse which makes solving eigenvector problems for matrices as big as 60000 by 60000 possible", it was not possible to run the LE algorithm on a 60,000 point dataset using the code provided by the authors on a machine with two GB of RAM. After investigating the cause of the problem, it was discovered that the machine was running out of memory while trying to solve the eigen problem on the 60,000-point dataset. It was determined that at least four GB of RAM were required to solve the size 60,000 problem, an amount of RAM that is not conventionally available in off-the-shelf computing systems.

With the 2 GB machine, the dataset size was reduced to 30,000 points for application of the LE algorithmic techniques. A 30,000-point subset of the MNIST data was used in the LE related experiments. For the LNLE algorithms, the full 60,000-point dataset was also used. For a fixed number of labelled data points $n_L$, 20 replications were performed, each time choosing a different random subset of the data points to classify. The sets of labelled data points $n_L$ used with respect to each algorithm were identical. For each experiment, the mean and the standard deviation of the error rate were recorded. Assuming normality in the distribution of the results, a 90% "confidence interval" is reported as a four standard deviation interval centered at the mean.

Previous experiments by Belkin and Niyogi were performed using varying numbers of labelled data points $n_L$ between 20 and 5,000. The experiments performed with respect to embodiments of the present invention were focused on datasets with between 20 and 500 labelled data points because it was in this range that the benefits provided by using unlabelled data were most striking.

In their work, Belkin and Niyogi tested a wide choice of the number of eigenvectors p, and gave two-dimensional tables for varying numbers of labelled data points $n_L$ and numbers p of eigenvectors v. Similar experiments are described herein, reporting only the optimal result for each experiment. It was determined that for a fixed number of labelled data points $n_L$, there was an optimal number p of eigenvectors v, with degraded performance using fewer or more than p. In addition, the optimal number of eigenvectors p increased with the number of labelled data points $n_L$. For the LNLE algorithms, the optimal number of eigenvectors was in general much smaller than for the full LE algorithm, and LNLE(R) and LNLE(G) had the same optimal choice. Table 1 reports the optimal number of eigenvectors p for each algorithm as a function of the number of labelled data points $n_L$.

It should be noted that, with respect to the following tables, a notation is used to indicate the size of the dataset n and the size of a local neighborhood used. With respect to the LE algorithm, (A) refers to the A-point dataset (e.g., (30) indicates 30,000 data points in the dataset). Similarly, with respect to the LNLE algorithms, (A, k) refers to an A-point dataset (e.g., A may be 30,000 or 60,000 or a similar amount) with a local neighborhood of size k points (e.g., 2,000 or 4,000 points), referred to above as $k_x$.

Table 1 shows an optimal number p of eigenvectors for the LE and LNLE algorithms, as a function of the number of labelled data points $n_L$. The optimum number was chosen to be the number of eigenvectors that resulted in the smallest mean error rate (averaged over the 20 replications).

TABLE 1

| | (p) | | | |
|---|---|---|---|---|
| | LE | LNLE | | |
| $n_L$ | (30) | (30, 2) | (60, 2) | (60, 4) |
| 20 | 10 | 10 | 10 | 10 |
| 50 | 20 | 10 | 7 | 10 |
| 100 | 20 | 20 | 7 | 15 |
| 500 | 50 | 20 | 10 | 20 |

Accuracy Results

Tables 2 and 3 contain basic results comparing LE and the LNLE algorithms, and Table 4 gives the probability of rejection for the experiments in Table 3.

Table 2 shows an accuracy comparison of LE and LNLE (G) algorithms. All accuracies are reported as 90% confidence intervals on the percent error rate.

TABLE 2

| | (% error rate - mean, 4X std dev) | | | |
|---|---|---|---|---|
| | LE | LNLE(G) | | |
| $n_L$ | (30) | (30, 2) | (60, 2) | (60, 4) |
| 20 | [25, 45] | [34, 49] | [48, 62] | [31, 52] |
| 50 | [8.5, 26] | [13, 27] | [24, 35] | [8.2, 29] |
| 100 | [7.5, 13] | [6.8, 14] | [9.1, 18] | [5.4, 12] |
| 500 | [3.8, 5.7] | [4.4, 5.1] | [3.8, 4.6] | [3.5, 4.0] |

The standard deviation of the accuracy was observed to be large relative to the observed difference in accuracy between the algorithms. In all cases studied, the confidence intervals of all algorithms tested overlap substantially. Taking a strict viewpoint and assuming independent experiments, the hypothesis that the performance of all the algorithms tested is identical cannot be rejected. However, the experiments are replicated, using the same labelled data points $n_L$ for different algorithms. Thus, it is expected that a large amount of the variance will depend on the random choice of labelled data points $n_L$ rather than the algorithms. Accordingly, confidence intervals that overlap but are substantially different are interpreted as being somewhat indicative of differing performance.

Table 3 shows an accuracy comparison of LE and LNLE (R) algorithms. All accuracies are reported as 90% confidence intervals on the percent error rate.

TABLE 3

| | | (% error rate - mean, 4X std dev) | | |
|---|---|---|---|---|
| | | | LNLE(R) | |
| $n_L$ | LE(30) | (30, 2) | (60, 2) | (60, 4) |
| 20 | [25, 44] | [19, 33] | [13, 28] | [17, 35] |
| 50 | [8.5, 25] | [12, 23] | [10.8, 21] | [8.8, 24] |
| 100 | [7.5, 13] | [6.8, 14] | [8.0, 14] | [5.5, 12] |
| 500 | [3.8, 5.7] | [4.4, 5.1] | [3.8, 4.6] | [3.5, 4.0] |

Table 4 shows rejection percentages for LNLE(R) as a function of the neighborhood size k and the number of data points, averaged over all experiments. In general, when describing the performance of LNLE(R) algorithms, reference is made to the performance on the non-rejected data points.

TABLE 4

| | (% rejection rate) | | |
|---|---|---|---|
| | | LNLE(R) | |
| $n_L$ | (30, 2) | (60, 2) | (60, 4) |
| 20 | .24 | .50 | .25 |
| 50 | .03 | .18 | .03 |
| 100 | .001 | .030 | .001 |

Although these experiments are somewhat preliminary, several observations can be made. Comparing the LE and the LNLE algorithms on 30,000 data points, it can be seen that for low numbers of labelled data points $n_L$ (e.g., between 20 to 50), LE outperforms LNLE(G), but LNLE(R) outperforms LE. For larger numbers of labelled data points $n_L$ (e.g., between 100 to 500), LNLE(R) and LNLE(G) perform nearly identically (very few points are rejected), and the performance is very close to that of LE.

In general, performing LNLE using 60,000 points rather than 30,000 leads to an increase in error if the neighborhood size k is kept fixed at 2,000 data points. However, the error decreases if the neighborhood size k is allowed to increase proportionally, e.g., to 4,000 data points. The increased performance seems to be highly comparable to the performance reported using the full LE algorithm on all 60,000 points. The apparent decrease in error from using a smaller neighborhood for the LNLE(R) algorithms with 20 labelled points and all 60,000 points is somewhat misleading because using a size 2,000 neighborhood provides a rejection rate of an additional quarter of the data as compared to the size 4,000 neighborhood (see Table 4). Roughly summarizing, for the smallest size dataset, the original LE algorithm outperforms LNLE (G), where every unlabelled data $n_U$ point is classified. However, LNLE(R) is able to identify a large subset of the data on which the classification is more accurate than that of the LE algorithm. For larger datasets, the performance of all the algorithms is very similar but the computational requirements for LNLE algorithms are much smaller.

Next, the use of LNLE algorithmic approaches in an SSII algorithm for classifying out-of-sample points (as described above with respect to FIG. 5) is considered. In this experiment, the 30,000-point subset of the MNIST data is used as the training set, and the remaining 30,000 points are used as the test set. Each test point x is classified by augmenting the adjacency graph $W_x$, finding the local neighborhood of size 2,000, solving the resulting eigen problem, and performing least-squares classification. The results for both LNLE(G) and LNLE(R) are shown in Table 5.

Table 5 shows out-of-sample error rates for the LNLE(G) and LNLE(R) algorithms. For each of the 30,000 out-of-sample data points x', the adjacency graph W is augmented (W') by adding that data point x', finding the local neighborhood $W_{x'}$, and classifying the data point x' as described above. The additional out-of-sample data point x' is then removed from the graph W and the next out-of-sample data point x" is similarly processed.

TABLE 5

| | (error rate - mean, 4X std dev) | |
|---|---|---|
| $n_L$ | LNLE(G) | LNLE(R) |
| 20 | [33, 48] | [18, 32] |
| 50 | [12, 26] | [11, 23] |
| 100 | [7.1, 14] | [7.1, 14] |
| 500 | [5.0, 5.9] | [5.0, 5.9] |

The results are very similar to the in-sample results for LNLE(G) and LNLE(R) given in Tables 2 and 3, thereby confirming the expected result that the natural extension of LNLE to out-of-sample points is essentially as accurate as LNLE on in-sample points.

Timing Results

Time requirements for various aspects of the algorithms are described herein. All measurements were made on a single machine, with a 2.4 GHz Intel® processor with two GB of RAM.

Table 6 shows the time (in seconds) required to compute an eight-neighbor (i.e., k=8) adjacency graph W over 30,000 and 60,000 points based on experimental embodiments of LNLE algorithms. The time for 60,000 points is almost precisely four times the time for 30,000 points, which is of course expected given that the bulk of the time in this part of the algorithm is spent computing the $n^2$ distances between the data points.

TABLE 6

| Dataset size (A) | Time (s) |
|---|---|
| 30,000 | 863 |
| 60,000 | 3444 |

Table 7 reports the time (in seconds) required to solve the interior eigen problem for varying dataset size and number of desired eigenvectors that arises in the LE and LNLE algorithms. For the size 2,000 and 4,000 eigenproblems, the time reported is the average over 100 trials. Only a single trial at size 30,000 was performed. It can be seen that for a fixed dataset size, the time required as a function of the number of eigenvalues is increasing approximately linearly. On the other hand, the dependence on the dataset size is much more drastic. The measurements indicate that the time requirement is increasing faster than $O(n^2)$, although much closer to $O(n^2)$ than $O(n^3)$.

TABLE 7

| Dataset size | (sec) Number of Eigenvectors (p) | | | | |
|---|---|---|---|---|---|
| (A) | 5 | 10 | 20 | 50 | 100 |
| 2,000 | 1.07 | 1.44 | 2.40 | | |
| 4,000 | 3.4 | 4.3 | 5.47 | 6.6 | |
| 30,000 | | 344 | 429 | 687 | 1331 |

In LNLE algorithms, for each unlabelled point x we find a subgraph of the adjacency graph using breadth-first search. Table 8 shows the time required to find the required subgraphs of the adjacency graph for neighborhoods of size $k_x$=2,000 and $k_x$=4,000, averaged over 100 trials.

TABLE 8

| Neighborhood Size ($k_x$) | (sec) Time |
|---|---|
| 2,000 | .035 |
| 4,000 | .051 |

In addition to finding the eigenvector matrix E, we must solve a positive-semidefinite linear system of the form $E_L^T E_L a_x = E_L^T y$, and use the hyperplane a to classify the unlabelled data. Because the number of eigenvectors p is much smaller than the number of data points n, the time to perform these operations is insignificant in comparison to the construction of the adjacency graph or the eigendecomposition process. For example, Cholesky factoring of a 100 by 100 positive definite matrix requires approximately two milliseconds, while Cholesky factoring of a 20 by 20 system takes less than one millisecond. Therefore, these times are ignored in the remainder of the analysis presented herein.

Adding up the times from the various tables, Table 9 shows the time required per point to classify unlabelled data points $n_U$, for a training set size 30,000 (for both LE and LNLE) and for size 60,000 (for LNLE only). The classification times are shown in seconds and amortized over the entire dataset. For amortization purposes, it is assumed that the entire dataset n is unlabelled. In this table, with respect to LE, (n, p) refers to an n number of unlabelled data points $n_U$ and p is the number of eigenvectors v used. LNLE(n,k,p) refers to the LNLE algorithm using n-thousand data points, a local neighborhood of size k thousand data points ($k_x$), and p eigenvectors v.

TABLE 9

| Algorithm | (sec) Time per Point |
|---|---|
| LE(30, 10) | .040 |
| LE(30, 20) | .043 |
| LE(30, 50) | .051 |
| LNLE(30, 2, 10) | 1.50 |
| LNLE(30, 2, 20) | 2.46 |
| LNLE(60, 2, 10) | 1.53 |
| LNLE(60, 4, 10) | 4.41 |
| LNLE(60, 4, 15) | 5.58 |
| LNLE(60, 4, 20) | 6.71 |

When used to classify an entire unlabelled dataset, LNLE algorithm is approximately two orders of magnitude slower than LE. However, there are several additional considerations. For example, for the larger dataset size, the LE algorithm could not be used at all in the experimental system because it requires an extremely large amount of RAM. Thus, while LNLE may not be faster under all circumstances, it provides the ability to solve larger problems than LE with lower memory requirements. In addition, LNLE can easily scale substantially farther. Moreover, because of its local nature, LNLE enables the classification of a desired subset of the points rather than the entire set and thus, incur only a subset of the computational expense. For example, if only a single data point needs to be classified out of 30,000 data points, LE(30,50) would take 1,550 seconds, while LNLE (30,2,20) would take only 869 seconds.

Perhaps most importantly, LNLE can be implemented by both SSII and TI algorithms, while LE is only a TI algorithm. With LE, for example assuming n=30,000 and $n_L$=100, the cost to classify a single additional out-of-sample data point x' given at a later time is approximately 429 seconds. With LE, the adjacency graph W can be reused, but it requires the computation of the global eigendecomposition for each subsequent addition of an out-of-sample data point x'. On the other hand, with LNLE, with for example a size 2,000 neighborhood ($k_x$), only about 2.45 seconds would be required to compute the neighborhood and perform the local eigendecomposition computations for an additional out-of-sample data point x'. This makes LNLE especially advantageous in scenarios where a single test data point is provided for immediate classification, i.e., situations in which batch processing is not possible.

Further, for additional computational efficiency, simple extensions to the LNLE algorithm can be used. For example, in one embodiment a small "center" consisting of $k_c$ very close together data points is formed and a neighborhood is built around that center. A single eigen problem is then used to classify all the data points in the center (not the entire neighborhood $k_x$) simultaneously. In this embodiment, the LNLE approach could provide essentially the same accuracy as other LNLE approaches, while providing a faster performance similar to LE based approaches while requiring less computational resources.

In alternative embodiments, instead of building an adjacency graph over the entire dataset, data structures such as kd-trees or ball trees may be used to speed up the algorithms. Moreover, these techniques may be used in conjunction with the "center" approach, since using the center approach the time to compute the adjacency graph can be a much larger fraction of the total time to process the classification.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer based method for learning a label of an unlabelled data point representing an image of a first physical object from a plurality of data points representing images of physical objects, the method comprising:

determining relative distances between all data points in the plurality of data points;

determining a set of neighboring data points with respect to the unlabelled data point, the set of neighboring data points not including all data points in the plurality of data points;

performing an eigen decomposition of a matrix of distances between each element of the set of neighboring data points to determine a function, wherein the matrix of distances consists only of distances between each element of the set of neighboring data points;

determining a first label based on a result from evaluating the function with respect to the unlabelled data point;

storing on a computer readable medium an association between the unlabelled data point and the determined first label; and performing image classification using the determined first label to classify the first physical object.

2. The method of claim 1, further comprising:

receiving an additional unlabelled data point representing an image of a second physical object;

determining a relative distance between the additional unlabelled data point and the plurality data points;

determining a second set of neighboring data points with respect to the additional unlabelled data point, the second set of neighboring data points not including all data points in the plurality of data points;

performing an eigen decomposition of a matrix of distances between each element of the second set of neighboring data points to determine a second function;

determining a second label based on a result from evaluating the second function with respect to the additional unlabelled data point;

storing on a computer readable medium an association between the additional unlabelled data point and the second label; and performing image classification using the determined second label to classify the second physical object.

3. A computer based method for learning a label of an unlabelled data point representing an image of a first physical object from a plurality of data points representing images of physical objects, the method comprising:

determining relative distances between all data points in the plurality of data points;

determining a set of neighboring data points with respect to the unlabelled data point;

performing an eigen decomposition of a matrix of distances between the set of neighboring data points to determine a function;

determining a first label based on a result from evaluating the function with respect to the unlabelled data point;

storing on a computer readable medium an association between the unlabelled data point and the determined first label;

performing image classification using the determined first label to classify the first physical object; and providing a confidence value based on a number of labelled data points determined within the set of neighboring data points.

4. The method of claim 1, wherein the eigen decomposition is not performed in response to determining that no labelled data points are within the set of neighboring data points and further wherein the determining the first label results in an error condition.

5. The method of claim 1, further comprising:

determining that no labelled data point is within the set of neighboring data points with respect to the unlabelled data point;

increasing a number of neighbors for determining the set of neighboring data points; and determining a second set of neighboring data points with respect to the unlabelled data point based on the increased number of neighbors.

6. The method of claim 1, wherein determining relative distances between all data points includes computing an adjacency matrix.

7. A computer based system for learning a label of an unlabelled data point representing an image of a first physical object from a plurality of data points representing images of physical objects, the system comprising:

means for determining relative distances between all data points in the plurality of data points;

means for determining a set of neighboring data points with respect to the unlabelled data point, the set of neighboring data points not including all data points in the plurality of data points;

means for performing an eigen decomposition of a matrix of distances between each element of the set of neighboring data points to determine a function, wherein the matrix of distances consists only of distances between each element of the set of neighboring data points;

means for determining a first label based on a result from evaluating the function with respect to the unlabelled data point;

means for storing on a computer readable medium an association between the unlabelled data point and the determined first label; and means for performing image classification using the determined first label to classify the first physical object.

8. The system of claim 7, further comprising:

means for receiving an additional unlabelled data point;

means for determining a relative distance between the additional unlabelled data point and the plurality data points;

means for determining a second set of neighboring data points with respect to the additional unlabelled data point, the second set of neighboring data points not including all data points in the plurality of data points;

means for performing an eigen decomposition of a matrix of distances between each element of the second set of neighboring data points to determine a second function;

means for determining a second label based on a result from evaluating the second function with respect to the additional unlabelled data point;

means for storing on a computer readable medium an association between the additional unlabelled data point and the second label; and means for performing image classification using the determined second label to classify the second physical object.

9. The system of claim 7, further comprising means for providing a confidence value based on a number of labelled data points determined within the set of neighboring data points.

10. The system of claim 7, wherein the means for performing the eigen decomposition fails to perform the eigen decomposition in response to receiving from the means for determining the set of neighboring data points an indication that no labelled data points are within the set of neighboring data points and further wherein the means for determining the first label provides an error condition.

11. The system of claim 7, further comprising:

means for determining that no labelled data point is within the set of neighboring data points with respect to the unlabelled data point; and means for increasing a number of neighbors for determining the set of neighboring data points;

wherein the means for determining the set of neighboring data points determines a second set of neighboring data points with respect to the unlabelled data point based on the increased number of neighbors.

12. The system of claim 7, wherein the means for determining relative distances between all data points includes a means for computing an adjacency matrix.

13. A computer based system for learning a label of an unlabelled data point representing an image of a first physical object from a plurality of data points representing images of physical objects, the system comprising:
    a local-neighborhood Laplacian Eigenmap (LNLE) classifier module for determining a set of neighboring data points with respect to the unlabelled data point and performing an eigen decomposition of a matrix of distances between each element of the set of neighboring data points to determine a function, the set of neighboring data points not including all data points in the plurality of data points, wherein the matrix of distances consists only of distances between each element of the set of neighboring data points;
    a module for determining a first label based on a result from evaluating the function with respect to the unlabelled data point;
    a computer readable medium for storing an association between the unlabelled data point and the determined first label; and
    a module for performing image classification using the determined first label to classify the first physical object.

14. A computer readable medium for learning a label of an unlabelled data point representing an image of a first physical object from a plurality of data points representing images of physical objects, the computer readable medium comprising software instructions that when executed in a computer processor cause a computer system to implement the steps of:
    determining relative distances between all data points in the plurality of data points;
    determining a set of neighboring data points with respect to the unlabelled data point, the set of neighboring data points not including all data points in the plurality of data points;
    performing an eigen decomposition of a matrix of distances between each element of the set of neighboring data points to determine a function, wherein the matrix of distances consists only of distances between each element of the set of neighboring data points;
    determining a first label based on a result from evaluating the function with respect to the unlabelled data point;
    storing on a computer readable medium an association between the unlabelled data point and the determined first label; and
    performing image classification using the determined first label to classify the first physical object.

15. The computer readable medium of claim 14, wherein the steps further comprise the steps of:
    receiving an additional unlabelled data point representing an image of a second physical object;
    determining a relative distance between the additional unlabelled data point and the plurality data points;
    determining a second set of neighboring data points with respect to the additional unlabelled data point, the second set of neighboring data points not including all data points in the plurality of data points;
    performing an eigen decomposition of a matrix of distances between each element of the second set of neighboring data points to determine a second function;
    determining a second label based on a result from evaluating the second function with respect to the additional unlabelled data point; and
    storing on a computer readable medium an association between the additional unlabelled data point and the second label; and
    performing image classification using the determined second label to classify the second physical object.

16. A computer readable medium for learning a label of an unlabelled data point representing an image of a first physical object from a plurality of data points representing images of physical objects, the computer readable medium comprising software instructions that when executed in a computer processor cause a computer system to implement the steps of:
    determining relative distances between all data points in the plurality of data points;
    determining a set of neighboring data points with respect to the unlabelled data point;
    performing an eigen decomposition of a matrix of distances between the set of neighboring data points to determine a function;
    determining a first label based on a result from evaluating the function with respect to the unlabelled data point;
    storing on a computer readable medium an association between the unlabelled data point and the determined first label;
    performing image classification using the determined first label to classify the first physical object; and
    providing a confidence value based on a number of labelled data points determined within the set of neighboring data points.

17. The computer readable medium of claim 14, wherein the eigen decomposition is not performed in response to determining that no labelled data points are within the set of neighboring data points and further wherein the determining the first label results in an error condition.

18. The computer readable medium of claim 14, wherein the steps further comprise the steps of:
    determining that no labelled data point is within the set of neighboring data points with respect to the unlabelled data point;
    increasing a number of neighbors for determining the set of neighboring data points; and
    determining a second set of neighboring data points with respect to the unlabelled data point based on the increased number of neighbors.

19. The computer readable medium of claim 14, wherein determining relative distances between all data points includes computing an adjacency matrix.

20. The computer based method of claim 1, wherein the first physical object is a first face, wherein the plurality of data points represent images in a database of faces, and wherein performing image classification comprises performing face recognition of the first face based on the database of faces.

21. The computer based method of claim 20, wherein performing face recognition further comprises:
    matching the first face to an image of a face from the database of faces, wherein each image in the database of faces is associated with an identity; and
    outputting the identity associated with the matching face.

22. The computer based method of claim 20, further comprising outputting an image from the database of faces as a result of face recognition.

23. The computer based method of claim 1, wherein the first physical object is a first handwriting sample, wherein the plurality of data points represent images of handwriting samples in a database of handwriting samples, and wherein performing image classification comprises classifying the first handwriting sample based on the database of handwriting samples.

24. The computer based method of claim 1, wherein the first physical object is first text sample, wherein the plurality of data points represent images of text samples in a database of text samples, and wherein performing image classification comprises performing text recognition of the first text sample based on the database of text samples.

* * * * *

UNITED STATES PATENT AND TRADEMARK OFFICE
CERTIFICATE OF CORRECTION

| | |
|---|---|
| PATENT NO. | : 7,412,425 B2 |
| APPLICATION NO. | : 11/108031 |
| DATED | : August 12, 2008 |
| INVENTOR(S) | : Ryan Rifkin and Stuart Andrews |

It is certified that error appears in the above-identified patent and that said Letters Patent is hereby corrected as shown below:

On the Title Page, Item (56) References Cited "OTHER PUBLICATIONS" add the following reference:

--Beyer, K. et al., "When is "Nearest Neighbor" Meaningful," Lecture Notes in Computer Science, pp 217-235, vol. 1540--

Signed and Sealed this

Twenty-eighth Day of October, 2008

JON W. DUDAS
*Director of the United States Patent and Trademark Office*